March 28, 1950     A. E. DENTLER     2,501,889
FRICTION SHOCK ABSORBING MECHANISM
Filed Aug. 3, 1946
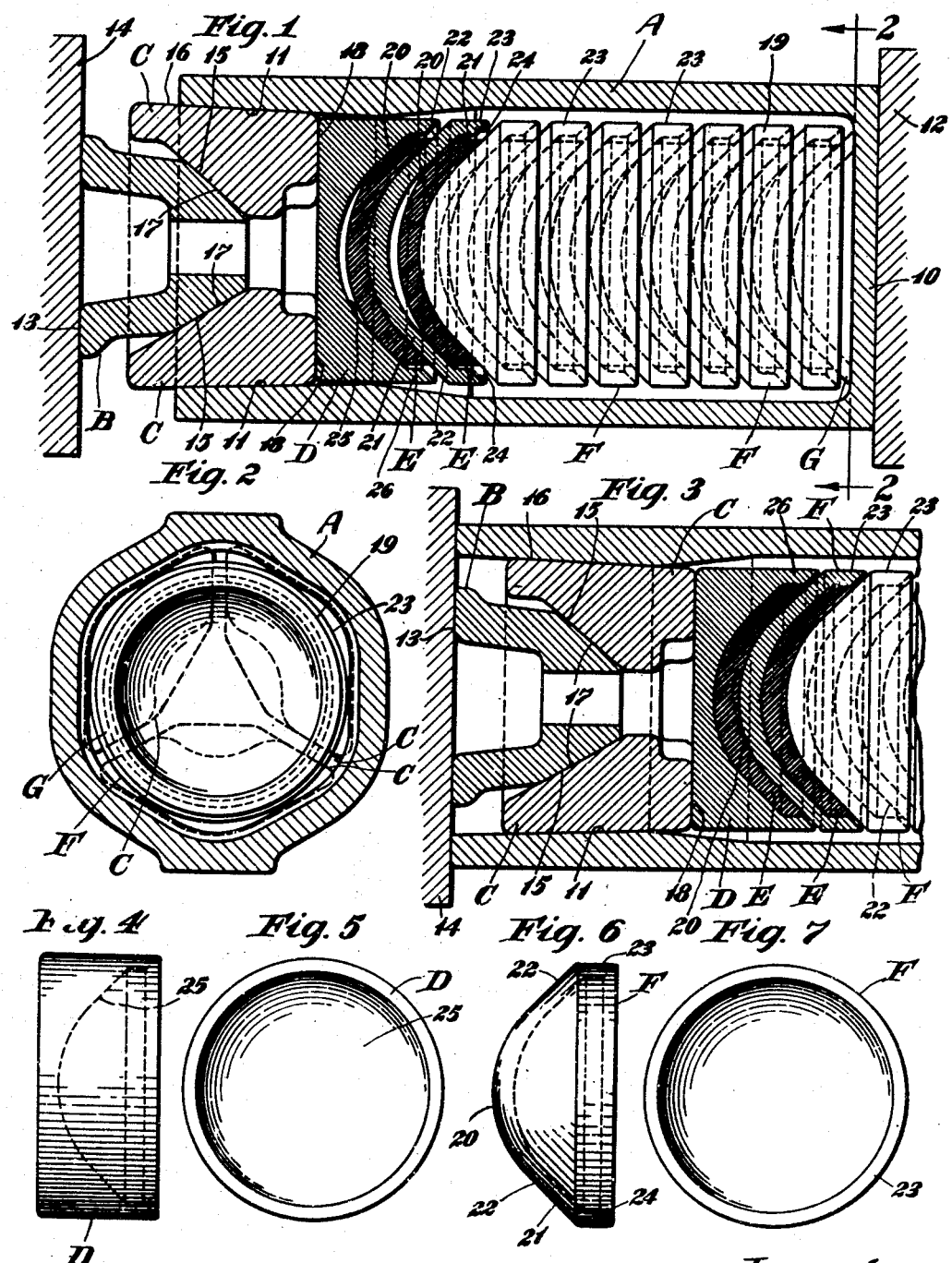
Inventor
Arnold E. Dentler
By Henry Fuchs
Atty.

Patented Mar. 28, 1950

2,501,889

UNITED STATES PATENT OFFICE 2,501,889

FRICTION SHOCK ABSORBING MECHANISM

Arnold E. Dentler, La Grange, Ill., assignor to W. H. Miner, Inc., Chicago, Ill., a corporation of Delaware Application August 3, 1946, Serial No. 688,230

5 Claims. (Cl. 213—34)

This invention relates to improvements in friction shock absorbing mechanisms, especially adapted for railway draft riggings.

One object of the invention is to provide a high capacity friction shock absorbing mechanism comprising a friction casing and a yieldingly resisted friction clutch slidingly telescoped within the casing, wherein the yielding resistance to movement of the clutch includes a cushioning element composed of a plurality of rubber pads or mats and heavy rigid spacing members alternated with the pads or mats, the spacing members having engagement with the mats to tension and compress the same during operation of the mechanism to produce initial, relatively light resistance, followed by heavier resistance produced by squeezing of the pads or mats between the spacing members.

A further object of the invention is to provide a cushioning means for shock absorbing mechanisms comprising a plurality of rubber pads or mats arranged in series and cooperating with concavo-convex, bowl-shaped, relatively heavy, spacing members alternated with the pads, wherein the bowl-shaped members have spherical center portions and conical side wall sections merging with the spherical center portions, wherein compression of the rubber pads between the spacing members by relative movement of these members toward each other places the rubber pads or mats under shear between the conical surfaces of the spacing members, thereby stretching the pads or mats, thus tensioning the same while being compressed to provide the desired cushioning action.

A still further object of the invention is to provide a cushioning means as set forth in the preceding paragraph, wherein, in the normal fully expanded condition thereof, clearance is provided between the spherical surface sections of the concavities of the spacing members and the rubber mats with the conical surface sections contacting said mats, thus providing for successive action of the conical and spherical surface portions on said mats to effect compression and stretching of the mats during partial compression of the mechanism and additional compression of the mats by direct action of the spherical surfaces of the spacing members on said mats to augment the resistance during further compression of the mechanism and thereby take care of relatively heavy shocks.

Still another object of the invention is to provide a shock absorber comprising a cushioning element composed of a plurality of rubber mats arranged in series and a plurality of concavo-convex spacing members alternated with the mats, wherein the spacing members shoulder against each other to limit compression of the cushioning element and form a solid column to transmit the load, thus protecting the rubber mats from overload and resultant damage.

Other objects of the invention will more clearly appear from the description and claims hereinafter following.

In the accompanying drawing forming a part of this specification, Figure 1 is a horizontal, longitudinal sectional view, partly in plan, of my improved friction shock absorbing mechanism, showing the same interposed between the usual front and rear followers of a railway draft rigging. Figure 2 is a transverse sectional view, corresponding substantially to the line 2—2 of Figure 1. Figure 3 is a view, similar to Figure 1, the rear end portion of the mechanism being broken away, showing the mechanism fully compressed. Figure 4 is a side elevational view of a spring follower employed in my improved mechanism. Figure 5 is an elevational view, looking from right to left in Figure 4. Figure 6 is a side elevational view of one of the spacing members employed in my improved mechanism. Figure 7 is an elevational view, looking from right to left in Figure 6.

As shown in the drawing, my improved friction shock absorbing mechanism comprises broadly a casing A; a wedge block B; three friction shoes C—C—C; a front follower member D bearing on the shoes; a plurality of rubber pads or mats E; a plurality of spacing members F; and a rear follower member G.

The casing A is of substantially hexagonal, transverse cross section, open at its front end and closed at its rear end by a transverse, vertical wall 10. At the open end, the casing is provided with three interior, inwardly converging friction surfaces 11 of V-shaped, transverse cross section, the angularly disposed faces of each V-shaped surface being formed by adjacent side walls of said hexagonal casing. The rear end of the casing A bears on the usual rear main follower of the railway draft rigging, which follower is indicated by 12.

The wedge block B has a flat, transverse, front end face 13, which bears on the usual front main follower of the draft rigging, which follower is indicated by 14. At the inner end, the block B presents three inwardly converging, flat wedge faces 15—15—15, which are arranged symmetrically about the longitudinal central axis of the mechanism.

The friction shoes C, which are three in number, are interposed between the wedge block B and the interior friction surfaces 11—11—11 of the casing, each shoe having a V-shaped friction surface 16 on its outer side engaging the corresponding V-shaped surface of the casing and a flat wedge face 17 on its inner side engaging the corresponding flat wedge face 15 of the block B. At the inner end, each shoe presents a flat, transverse abutment face 18 adapted to cooperate with the front follower D.

The wedge B and the shoes C—C—C together form a friction clutch which is slidingly telescoped within the open end of the casing A and has its movement inwardly of the casing resisted by a cushioning element 19 comprising the rubber pads E and the spacing members F, and front and rear follower members D and G.

The rubber pads or mats E are arranged in series lengthwise of the mechanism, each pad or mat extending transversely of the casing. Each mat E is in the form of a circular disc and before being assembled with the other parts of the mechanism is substantially flat.

The spacing members F are alternated with the pads or mats E, as clearly shown in Figures 1 and 3. Each spacing member F is in the form of a bowl-shaped, relatively thick, steel washer of circular outline, having a convex outer side and a concave inner side. These convex and concave sides present truly spherical surface portions at the central areas, as indicated at 20—20, and terminate in outwardly diverging wall portions 21—21 which present conical surface areas 22—22. Each bowl-shaped spacing member has a peripheral flange 23 extending laterally from the concave side thereof. The flange 23 is relatively thick and has an inwardly beveled end face 24 adapted to seat truly on the conical surface 22 of the adjacent spacing member to limit compression of the corresponding rubber pad or mat E.

The follower D is in the form of a block having a flat, transverse, outer end face adapted to bear on the inner ends of the shoes. At its inner end, the block D has a concavity 25, corresponding in contour to the concave surface portions of the spacing members F. The concavity 25 forms a seat for the adjacent rubber pad or mat E on which the follower D bears. The follower D also has a peripheral flange 26 similar to the flange 23 of the spacing members and acting in a similar manner.

The follower G is in the form of a bowl-shaped, relatively thick, steel washer similar to the spacing members F, with the exception that it does not have a peripheral flange. The follower G forms the rear end portion of the cushioning element 19 and bears at its concave side on the inner side of the rear wall 10 of the casing.

When assembled within the casing A, the rubber mats E, which are alternated with the concavo-convex spacing members, are held therebetween in bowed, or dished condition, in full contact with the convex sides of said members, being normally maintained in this position by being clamped between the conical surface areas 22—22 of the adjacent spacing members. In this normal position of the parts, there is a decided clearance between the spherical surface 20 of the concavity of each spacing member and the opposed convex surface area of the adjacent rubber mat, as clearly shown in Figure 1. Inasmuch as the concave side of the follower D and the convex side of the follower G are respectively identical with the concave and convex sides of the spacing members, these surfaces cooperate with the adjacent mats or pads in the same manner as the corresponding surfaces of the spacing members F.

With the arrangement of rubber mats between the concave and convex sides of the spacing members and followers, as hereinbefore described, and the mats engaged by the angularly disposed walls presented by the conical area portions of these surfaces, each rubber mat is subjected to combined compression and shear stresses at the zone of engagement during compression of the yielding element 19, and to stretching or tension between the zones of engagement. This action continues during compression of the mechanism until the spherical surface areas of the concave sides of the spacing members and the front follower D come into engagement with the mats, whereupon the latter are also subjected to compression between the concave and convex, spherical surface areas. The action is thus a graduated one, the resistance offered building up as the compression of the mechanism progresses.

The operation of my improved shock absorbing mechanism is as follows: Upon the mechanism being compressed by relative approach of the main followers of the draft rigging, the wedge B is forced inwardly or rearwardly of the casing A, thereby setting up a wedging action between the wedge and the friction shoes, spreading the latter apart and forcing the same into tight frictional engagement with the friction surfaces of the casing while sliding the same inwardly of the casing against the resistance offered by the yielding element 19. The required frictional resistance is thus provided which gradually increases during the compression stroke, the resistance building up as the compression of the rubber mats progresses, the initial cushioning effect of the rubber mats being relatively soft as they are being stretched or tensioned and placed under combined compression and shear at their outer portions, thereby taking care of the lighter shocks to which the mechanism is subjected in service. As heavier shocks are encountered, the resistance offered by the rubber mats progressively increases, ultimate high capacity being reached when the spherical surface areas of the concave and convex surfaces of the spacing members and followers become active to compress the mats therebetween. Compression of the mechanism is positively limited by the flanges 26 and 23 of the follower D and the spacing members F, thereby protecting the mats against excessive compression. Upon the actuating force being removed, the tendency of the rubber mats to expand, while returning to their normal shape, restores all of the parts to the normal full release position shown in Figure 1.

I claim:

1. In a shock absorber, the combination with a casing having interior friction surfaces; of a central wedge block adapted to receive the actuating force; friction shoes surrounding said block and slidingly telescoped within said casing, said shoes having wedging engagement with the wedge block and sliding frictional engagement with the friction surfaces of the casing; and yielding means within the casing opposing inward movement of said shoes, said yielding means including a plurality of rubber mats arranged in series lengthwise of the mechanism, and rigid spacing members alternated with said mats, each spacing member having one side formed with a projection and the opposite side formed with an indentation adapted to receive said projection, said projections and indentations having opposed side walls angularly disposed with respect to the central longitudinal axis of the mechanism, said projections and indentations and said angularly disposed side walls subjecting said mats to compression and shear, and cooperating abutment areas between the side walls of said members adapted to be brought together to compress said mats after a predetermined compression of the mechanism.

2. In a cushioning element adapted for compression between two members relatively movable toward and away from each other, the combination with a plurality of rubber mats arranged in series, said mats being of uniform thickness throughout; of a plurality of rigid spacing members alternated with said mats, each spacing member having flaring side walls bearing on said mats and a curved central portion connecting said side walls, said curved central portion presenting inner concave and outer convex faces, said concave face being bowed inwardly away from the adjacent mat in the full release position of the parts.

3. In a cushioning element adapted for compression between two members relatively movable toward and away from each other, the combination with a plurality of rubber mats arranged in series; of a plurality of rigid, bowl-shaped spacing members alternated with said mats, each bowl-shaped member having a central wall portion presenting inwardly and outwardly curved surface areas on opposite sides of spherical contour, and a flaring side wall presenting conical interior and exterior surfaces, said flaring side walls bearing on said mats, and said inwardly curved surfaces being bowed away from said mats in the full release position of the mechanism.

4. In a cushioning element adapted for compression between two members relatively movable toward and away from each other, the combination with a plurality of rubber mats arranged in series; of a plurality of rigid, bowl-shaped spacing members alternated with said mats, each bowl-shaped member having an annular side wall of conical formation bearing on said mats and a curved end wall closing the narrow end of the conical wall formation, said end wall presenting an inwardly bowed, interior surface and an outwardly bowed, exterior surface, said inwardly bowed surface being curved away from the corresponding mat in the full release position of the mechanism.

5. In a cushioning element adapted for compression between two members relatively movable toward and away from each other, the combination with a plurality of rubber mats arranged in series; of a plurality of rigid, bowl-shaped spacing members alternated with said mats, each bowl-shaped member having an annular side wall of conical formation bearing on the adjacent mats and a curved end wall closing the narrow end of said conical wall formation, said end wall having an inwardly bowed, interior surface of spherical contour, bowed away from the adjacent mat in the full release position of the mechanism and an outwardly bowed, exterior surface of spherical contour.

ARNOLD E. DENTLER.

REFERENCES CITED

The following references are of record in the file of this patent:

UNITED STATES PATENTS

| Number | Name | Date |
| --- | --- | --- |
| 1,108,488 | Bugg | Aug. 25, 1914 |
| 1,725,523 | Keys | Aug. 20, 1929 |
| 1,905,492 | O'Connor | Apr. 25, 1933 |
| 2,165,383 | Johnson et al. | July 11, 1939 |
| 2,260,532 | Lindeman | Oct. 28, 1941 |

FOREIGN PATENTS

| Number | Country | Date |
| --- | --- | --- |
| 357,395 | Italy | Mar. 14, 1938 |
| 432,304 | Great Britain | July 24, 1935 |
| 440,925 | Great Britain | Jan. 8, 1936 |
| 727,324 | France | Mar. 22, 1932 |